United States Patent
Hou et al.

(10) Patent No.: US 7,760,451 B2
(45) Date of Patent: Jul. 20, 2010

(54) IMAGING DEVICE CAPABLE OF RETRACTING LENS UNIT THEREOF AND LENS UNIT PROTECTING METHOD THEREOF

(75) Inventors: Zhen Hou, Guangdong (CN); Chang-Tao Zhong, Guangdong (CN); An-Fei Fu, Guangdong (CN)

(73) Assignees: Premier Image Technology (China) Ltd., Foshan, Guangdong Povince (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 162 days.

(21) Appl. No.: 12/197,317

(22) Filed: Aug. 25, 2008

(65) Prior Publication Data

US 2009/0195889 A1 Aug. 6, 2009

(30) Foreign Application Priority Data

Feb. 1, 2008 (CN) .................. 2008 1 0300304

(51) Int. Cl.
*G02B 7/02* (2006.01)
(52) U.S. Cl. .................. 359/822; 359/819; 359/823
(58) Field of Classification Search .................. 359/819, 359/821, 822, 823, 824, 825, 826
See application file for complete search history.

(56) References Cited

U.S. PATENT DOCUMENTS

2004/0004670 A1* 1/2004 Yamashita .................. 348/345

FOREIGN PATENT DOCUMENTS

JP 2006-177991 A 7/2006

\* cited by examiner

*Primary Examiner*—Timothy J Thompson
(74) *Attorney, Agent, or Firm*—Zhigang Ma

(57) ABSTRACT

An imaging device includes a housing, a lens unit, a detection unit, a central processing unit and a driving unit. The lens unit is configured for moving between a first position where the lens unit is received in the housing, and a second position where the lens unit extends from the housing. The detection unit is configured for detecting a current acceleration of the imaging device. The central processing unit is configured for receiving the current acceleration and generating a low driving voltage value if the current acceleration is smaller than a predetermined value and a high driving voltage value if the current acceleration is equal to or greater than the predetermined value. The driving unit is configured for receiving the generated driving voltage value from the central processing unit and retracting the lens unit from the second position to the first position based on the driving voltage.

7 Claims, 4 Drawing Sheets

IMAGING DEVICE CAPABLE OF RETRACTING LENS UNIT THEREOF AND LENS UNIT PROTECTING METHOD THEREOF

BACKGROUND

1. Field of the Invention

The present invention relates to imaging technology and, particularly, to an imaging device having a lens unit which is retracted when not in use and a lens unit protecting method thereof.

2. Description of the Related Art

Zoom lenses are widely used in imaging devices, such as digital cameras or camcorders for allowing clear imaging at various distances from an object. It is beneficial that the zoom lenses are accommodated within the imaging device, e.g., a housing or a lens holder, to avoid being stained or abraded when not in use. Therefore, some imaging devices are structured so that the zoom lenses thereof are retracted into the imaging devices when not in use and extended from the imaging devices when needed. This protection mechanism works well except in some situations. For example, the imaging device is suddenly dropped during use.

What is needed, therefore, is to provide an imaging device having a lens unit which is retracted when not in use and a lens unit protecting method, in which the above problem is eliminated or at least alleviated.

SUMMARY

An exemplary imaging device includes a housing, a lens unit, a detection unit, a central processing unit, and a driving unit. The lens unit is capable of moving between a first position where the lens unit is received in the housing, and a second position where the lens unit extends outward from the housing. The detection unit is configured for detecting a current acceleration of the imaging device. The central processing unit is configured for receiving the current acceleration from the detection unit and generating a low driving voltage value if the current acceleration is smaller than a predetermined value and a high driving voltage value if the current acceleration is equal to or greater than the predetermined value. The driving unit is configured for receiving the generated driving voltage value from the central processing unit and retracting the lens unit from the second position to the first position based on the driving voltage.

Other advantages and novel features of the present invention will become more apparent from the following detailed description of an exemplary embodiment when taken in conjunction with the accompanying drawings.

DETAILED DESCRIPTION OF THE EMBODIMENTS

References will now be made to the figures to describe exemplary embodiments in detail.

Figure 1:
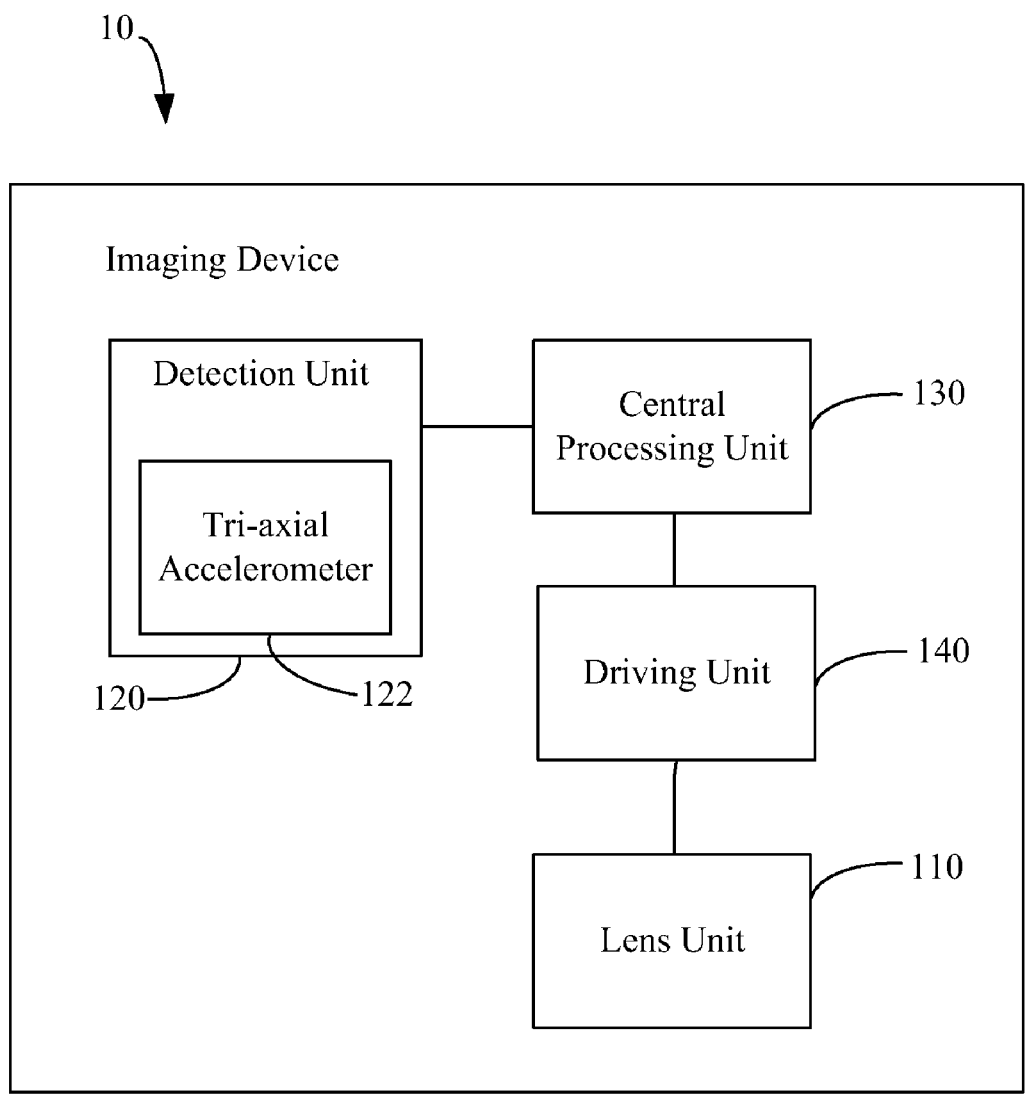
FIG. 1 is a functional block diagram of an imaging device according to an exemplary embodiment.
Figure 2:
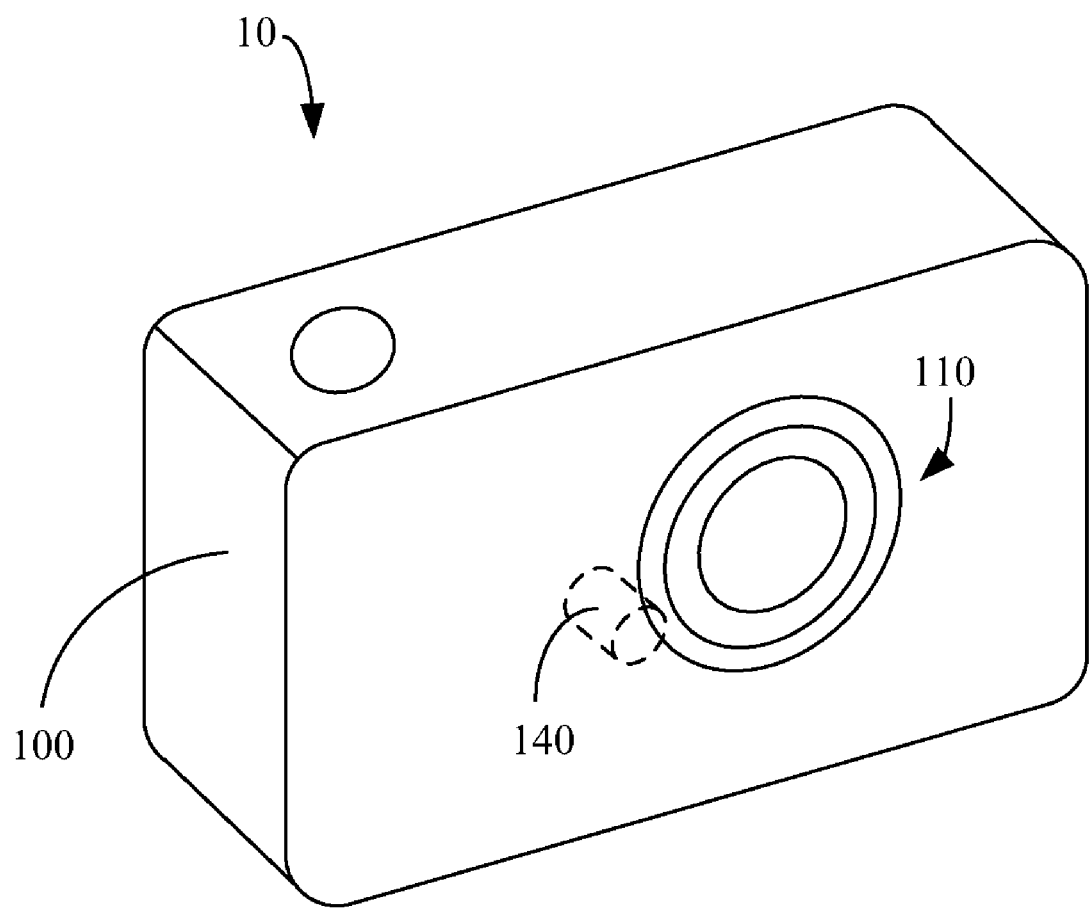
FIG. 2 is a schematic, isometric view of the imaging device of FIG. 1, showing the lens unit in a first position.
Figure 3:
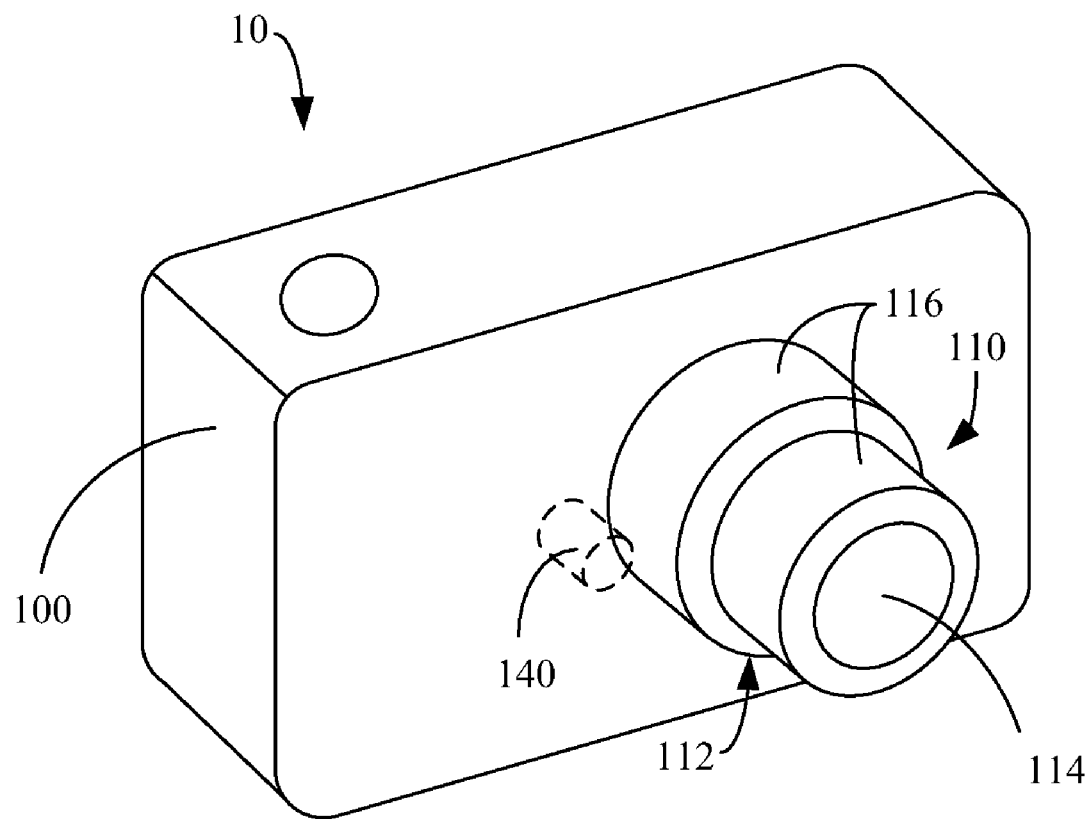
FIG. 3 is similar to FIG. 2, but showing the lens unit in a second position.

Referring to FIGS. 1 to 3, an imaging device 10, according to an exemplary embodiment, is shown. The imaging device 10 includes a housing 100, a lens unit 110, a detection unit 120, a central processing unit 130, and a driving unit 140. The lens unit 110 is capable of moving between a first position where the lens unit 110 is received in the housing 100, as shown in FIG. 2, and a second position where the lens unit 110 extends outward from the housing 100, as shown in FIG. 3. In this embodiment, the lens unit 110 includes an extension tube 112 and at least one lens 114 received in the extension tube 112. The extension tube 112 is formed of several telescoping segments 116. The segments 116 are joined together by spiraled grooves so that the segments twist and spiral outwards as the extension tube 112 extends.

The detection unit 120 is configured for detecting a current acceleration of the imaging device 10. Also, the rate of the changing acceleration of the imaging device 10 may be used to determine potential danger in another embodiment. The central processing unit 130 is configured for receiving the current acceleration from the detection unit 120 and generating a low driving voltage value if the current acceleration is smaller than a predetermined value and a high driving voltage value if the current acceleration is approximately equal to, or greater than, the predetermined value. The driving unit 140 is configured for receiving the generated driving voltage value from the central processing unit 130 and retracting the lens unit 110 from the second position to the first position based on the driving voltage. In this embodiment, the predetermined value is the acceleration of gravity. It is to be understood that retracting speed of the lens unit 110 from the second position to the first position is proportional to the driving voltage. That is, if the current acceleration is approximately equal to, or greater than, the acceleration of gravity, the central processing unit 130 determines that the imaging device 10 drops, and the driving unit 140 retracts the lens unit 110 fast based on the high driving voltage value. If the current acceleration is smaller than the acceleration of gravity, the central processing unit 130 determines that the imaging device 10 does not drops and is used normally, the driving unit 140 retracts the lens unit 110 slow based on the low driving voltage value.

The detection unit 120 includes a tri-axial accelerometer 122 detecting the acceleration of the imaging device 10. The tri-axial accelerometer 122 detects the current acceleration of the imaging device 10. The central processing unit 130 receives the current acceleration of the imaging device 10 from the tri-axial accelerometer 122 and determines that the imaging device 10 drops if the current acceleration of the imaging device 10 is approximately equal to, or greater than, the acceleration of gravity, and generates a high driving voltage. The driving unit 140 receives the generated high driving voltage from the central processing unit 130 and retracting the lens unit 110 from the second position to the first position based on the high driving voltage. As a result, the lens unit 110 is retracted and protected.

Figure 4:
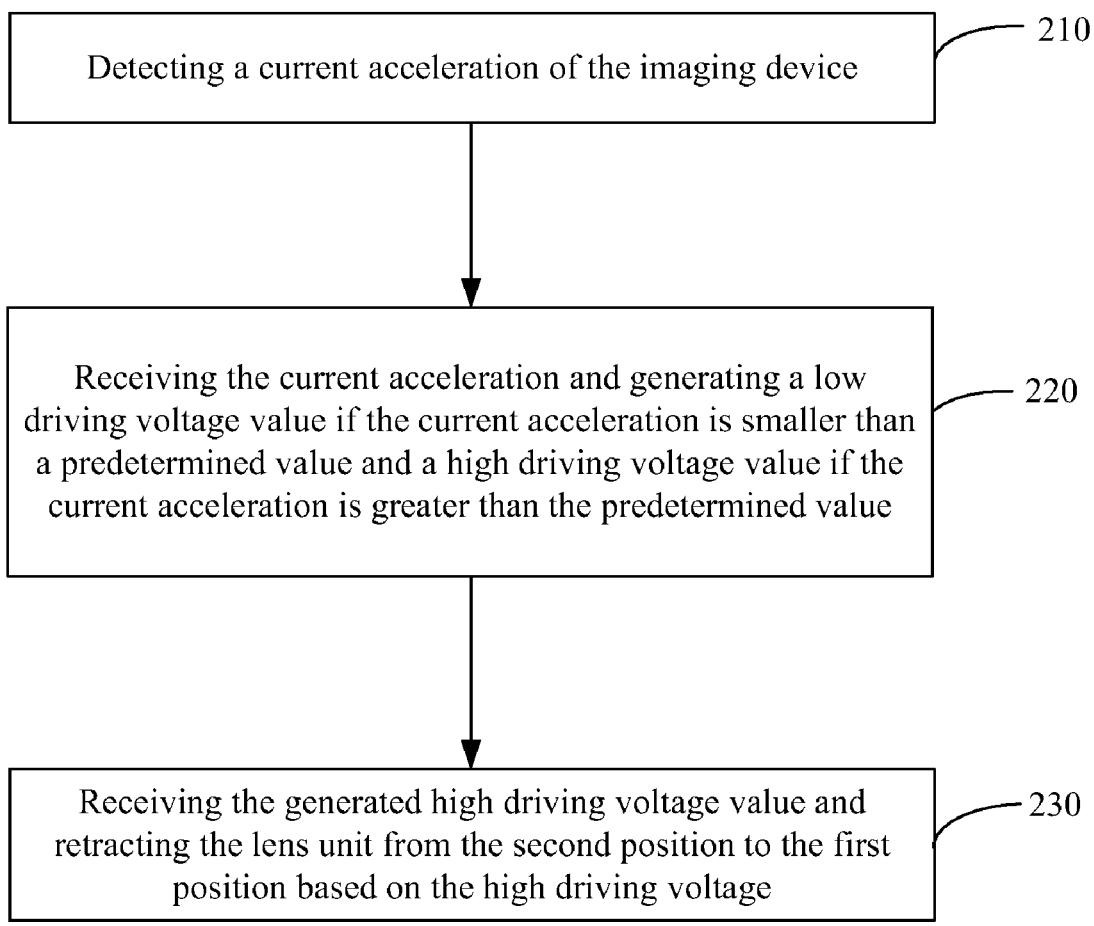
FIG. 4 is a flowchart of a method for protecting a lens module of the imaging device of FIG. 1.

Referring to FIG. 4, a method for protecting the lens unit 110 of the imaging device 10 includes steps 210 through 230. Step 210: detecting a current acceleration of the imaging device 10. Step 220: receiving the current acceleration and generating a low driving voltage value if the current acceleration is smaller than a predetermined value and a high driving voltage value if the current acceleration is greater than the predetermined value. Step 230: receiving the generated high driving voltage value and retracting the lens unit 110 from the second position to the first position based on the high driving voltage.

In the step 210, the detection unit 120 detects the current acceleration of the imaging device 10. In the step 220, the central processing unit 130 receives the current acceleration of the imaging device 10 and generates a low driving voltage value if the current acceleration is smaller than a predetermined value and a high driving voltage value if the current acceleration is equal to, or greater than, the predetermined value. In this embodiment, the predetermined value is the acceleration of gravity. In the step 230, the driving unit 140 receives the generated high driving voltage value from the central processing unit 130 and retracting the lens unit 110 from the second position to the first position based on the high driving voltage. The driving unit 140 retracts the lens unit 110 from the second position to the first position faster based on the high driving voltage.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An imaging device comprising:
    a housing;
    a lens unit capable of moving between a first position where the lens unit is received in the housing, and a second position where the lens unit extends outward from the housing;
    a detection unit configured for detecting a current acceleration of the imaging device;
    a central processing unit configured for receiving the current acceleration from the detection unit and generating a low driving voltage value if the current acceleration is smaller than a predetermined value and a high driving voltage value if the current acceleration is approximately equal to, or greater than, the predetermined value; and
    a driving unit configured for receiving the generated driving voltage value from the central processing unit and retracting the lens unit from the second position to the first position based on the driving voltage.

2. The imaging device as claimed in claim 1, wherein the detection unit includes a tri-axial accelerometer for detecting current acceleration.

3. The imaging device as claimed in claim 1, wherein the predetermined value is the acceleration of gravity.

4. The imaging device as claimed in claim 1, wherein the retraction speed of the lens unit is proportional to the driving voltage applied to the driving unit.

5. The imaging device as claimed in claim 1, wherein the lens unit includes an extension tube and at least one lens received in the extension tube.

6. A method for protecting a lens unit of an imaging device, the imaging device comprising a housing, the lens unit being capable of moving between a first position where the lens unit is received in the housing, and a second position where the lens unit extends from the housing, the method comprising:
    detecting a current acceleration of the imaging device;
    receiving the current acceleration and generating a low driving voltage value if the current acceleration is smaller than a predetermined value and a high driving voltage value if the current acceleration is greater than the predetermined value; and
    receiving the generated high driving voltage value and retracting the lens unit from the second position to the first position based on the high driving voltage.

7. The method as claimed in claim 6, wherein the predetermined value is the acceleration of gravity.

* * * * *